July 22, 1924.

L. D. SOUBIER 1,502,068

GLASS CIRCULATING MECHANISM

Filed Oct. 2, 1922

INVENTOR
Leonard D. Soubier
By J. F. Rule.
His attorney

Patented July 22, 1924.

1,502,068

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

GLASS-CIRCULATING MECHANISM.

Application filed October 2, 1922. Serial No. 591,751.

*To all whom it may concern:*

Be it known that I, LEONARD D. SOUBIER, a citizen of the United States, residing at Toledo, in the county of Lucas and State of Ohio, have invented new and useful Improvements in Glass-Circulating Mechanism, of which the following is a specification.

My invention relates to means for circulating molten glass past a gathering point in a tank or pool. An object of the invention is to provide practical means for circulating the glass and maintaining it in suitable condition at the gathering point for entering the molds of a glass forming machine which gathers the glass by suction. The invention aims to provide practical means for gathering directly from the main tank, thereby eliminating the auxiliary rotating gathering tank which is in common use at the present time with machines of the Owens type, in which machines the molds are charged by suction from the gathering tank.

Other objects of the invention will appear hereinafter.

Figure 1:
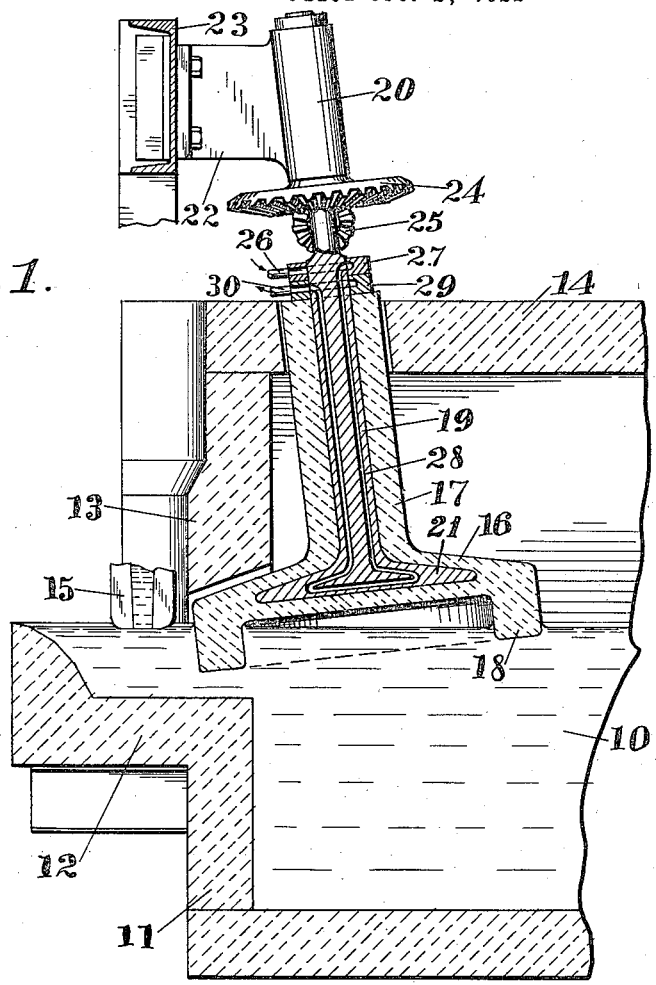
Figure 1 is a sectional elevation of a construction embodying the principles of my invention.

The molten glass 10 is contained in the melting or refining tank 11 provided with a forehearth or extension 12. Above the forehearth is a concave wall or jack arch 13 extending downward from the roof 14 of the tank to within a short distance of the surface of the glass. There is thus exposed a surface of the glass in the extension 12 in front of said wall from which the glass is gathered. Molds 15 carried on a continuously rotating mold carriage of a suction gathering machine are brought successively over the boot 12, are lowered into contact with the glass and gather their charges of glass by suction.

In order to maintain a circulation of glass from the body of the tank through the forehearth and back into the tank, thereby preventing chilling and stagnation of the glass in the forehearth, the following mechanism is provided for circulating the glass. A continuously rotating circulating device comprises a head 16 moving in the glass and a stem 17 projecting upward through the roof 14 of the furnace. Said head 16 is substantially in the form of a disk having an annular peripheral extension or flange 18 projecting downward into the glass. The circulating device is made of fire clay or other refractory material which will withstand the heat and is reenforced by a central metal core 19 terminating at its lower end in a disk-like enlargement 21. This core forms a driving shaft journalled in a stationary bearing 20 formed on a bracket 22 attached to a framework 23.

Keyed to the shaft 19 is a gear 24 driven by a pinion 25 connected to any suitable source of power. Means are preferably provided for circulating water, air or other cooling fluid through the device. The fluid enters through a pipe 26 connected to a collar 27 having an annular chamber in communication with a passageway 28 leading downward through the stem 19 and returning to a collar 29 connected with an outlet pipe 30.

Figure 2:
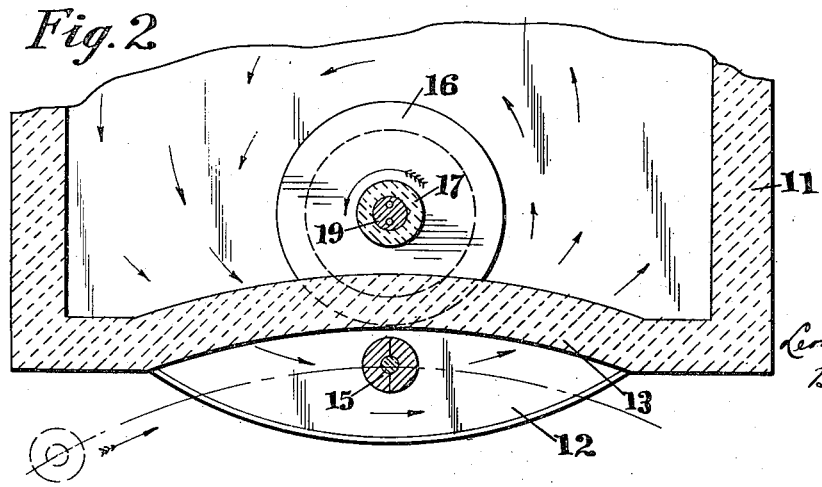
Figure 2 is a sectional plan view of the same.

As the head 16 rotates in contact with the molten glass, it causes a circulation of the glass from the body of the tank through the forehearth 12 and back into the tank as indicated by the arrows in Figure 2. The circulating head may be inclined, as shown, so that the forward portion thereof dips deeper into the glass than the rear portion. In this manner, the driving or dragging effect of the head on the glass is applied mainly near the forehearth, causing comparatively little disturbance of the glass at a point remote from the gathering area. Although the head 16 is shown inclined, it will be understood that it may be arranged horizontally so that the entire periphery dips into the glass at equal distance, or the head may in some instances be inclined in the reverse direction, depending on the working conditions and specific results desired.

Modifications may be resorted to within the spirit and scope of my invention.

What I claim is:

1. The combination of a tank to contain molten glass, said tank comprising a main portion and a forehearth projecting beyond a wall of the tank to expose a surface of the glass, a glass circulating device within said main portion of the tank behind said wall, and means to actuate said device and thereby maintain a continuous circulation of the glass forming said surface.

2. The combination of a tank to contain molten glass, said tank comprising a forehearth projecting beyond a wall of the tank to expose a surface of the glass, and a rotary circulating device within the tank extending into the glass and operable to cause a circulation of glass from within the tank through the forehearth and back into the tank.

3. The combination of a tank to contain molten glass, said tank comprising a forehearth projecting beyond a wall of the tank to expose a surface of the glass, means for circulating the glass comprising a body in contact with the glass in the tank, a stem rising from said body and projecting above the tank, and driving means connected with said stem for rotating said body.

4. The combination of a tank to contain molten glass, said tank comprising a forehearth projecting beyond a wall of the tank to expose a surface of the glass, means for circulating glass through the forehearth comprising a head in said tank, said head having an annular flange or projection extending downward into the glass, and means to rotate said head.

5. The combination of a tank to contain molten glass, means to circulate the glass comprising a head within the tank and in contact with the glass, and means to rotate said head about an inclined axis.

6. The combination of a tank to contain molten glass, means to circulate the glass comprising a head within the tank and in contact with the glass, and means to rotate said head about an axis more nearly vertical than horizontal.

7. The combination of a tank to contain molten glass, means to circulate the glass comprising a head within the tank and in contact with the glass, and means to rotate said head continuously about an approximately vertical axis.

8. The combination of a furnace to contain molten glass, said furnace having a forehearth extension, and comprising a concave wall or jack arch above said extension, whereby the glass in the forehearth is exposed for gathering, means for circulating the glass past the gathering point comprising a disk-like head within the tank, a stem projecting upward therefrom through the roof of the furnace, said stem being perpendicular to said head and forwardly and upwardly inclined so that said head is inclined with its forward portion dipping deeper into the glass than the rearward portion, and means to rotate said head about the axis of said stem.

9. The combination of a tank to contain molten glass, means to circulate the glass comprising a head within the tank and in contact with the glass, a stem projecting upward from said head, said head and stem being formed of fire clay and provided with metal reenforcing, means to circulate a cooling fluid therethrough, and means for rotating said head.

Signed at Toledo, in the county of Lucas and State of Ohio, this 28th day of Sept., 1922.

LEONARD D. SOUBIER.